F. STREICH.
DOUGH MOLDING MACHINE.
APPLICATION FILED JAN. 22, 1909.

947,500.

Patented Jan. 25, 1910.
4 SHEETS—SHEET 1.

Witnesses
A. J. McCauley
Lenore Clark.

Inventor:
Frank Streich
by J. R. Cornwall
Atty.

F. STREICH.
DOUGH MOLDING MACHINE.
APPLICATION FILED JAN. 22, 1909.
947,500.
Patented Jan. 25, 1910.
4 SHEETS—SHEET 2.
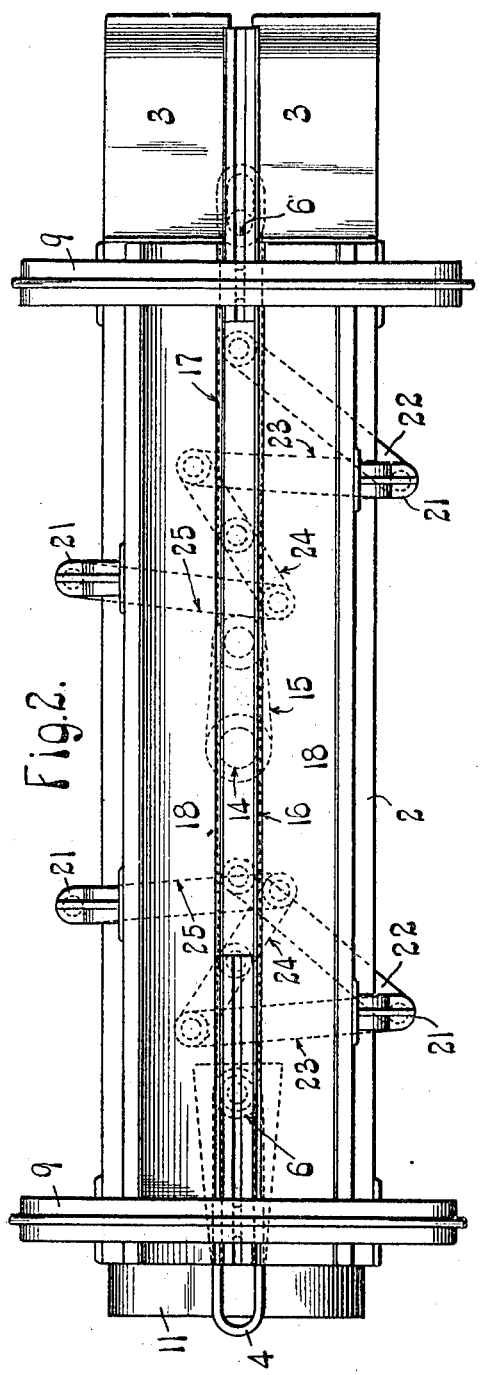
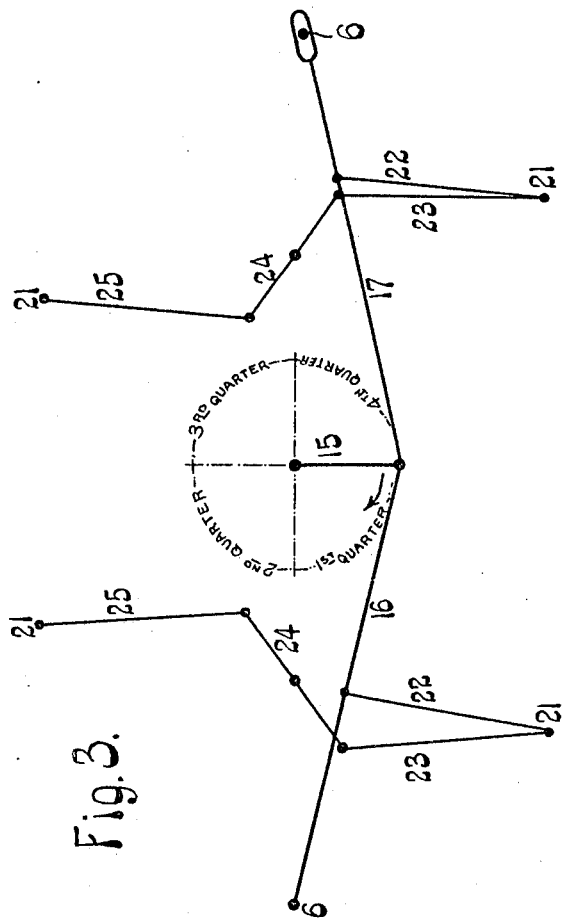
Witnesses
A. J. McCauley
Lenore Clark.
Inventor:
Frank Streich
by F. R. Cornwall
Atty.

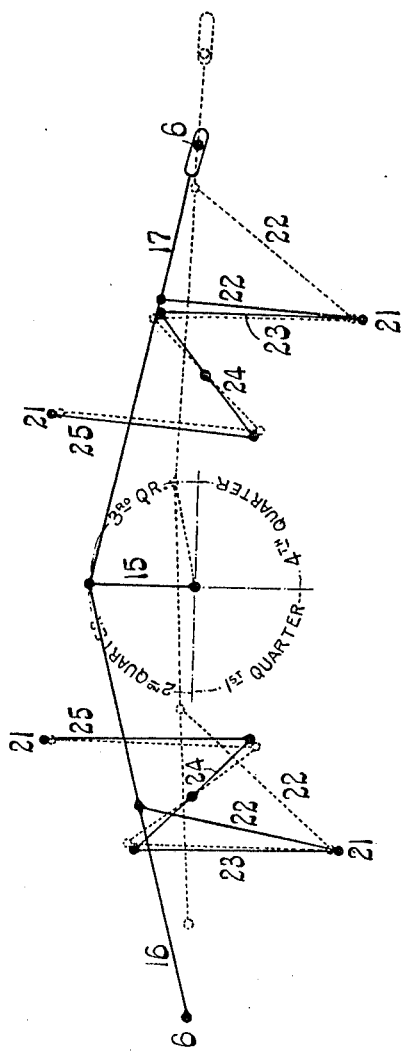

F. STREICH.
DOUGH MOLDING MACHINE.
APPLICATION FILED JAN. 22, 1909.

947,500.

Patented Jan. 25, 1910.
4 SHEETS—SHEET 4.

Witnesses
A. J. McCauley
Lenore Clark

Inventor:
Frank Streich
by F. W. Cornwall Atty.

UNITED STATES PATENT OFFICE.

FRANK STREICH, OF ST. LOUIS, MISSOURI, ASSIGNOR, BY MESNE ASSIGNMENTS, TO AMERICAN BAKERS' MACHINERY COMPANY, OF ST. LOUIS, MISSOURI, A CORPORATION OF MISSOURI.

DOUGH-MOLDING MACHINE.

947,500.     Specification of Letters Patent.     Patented Jan. 25, 1910.

Application filed January 22, 1909. Serial No. 473,768.

*To all whom it may concern:*

Be it known that I, FRANK STREICH, a citizen of the United States, residing at St. Louis, Missouri, have invented a certain new and useful Improvement in Dough-Molding Machines, of which the following is a full, clear, and exact description, such as will enable others skilled in the art to which it appertains to make and use the same, reference being had to the accompanying drawings, forming part of this specification, in which—

Figure 1:
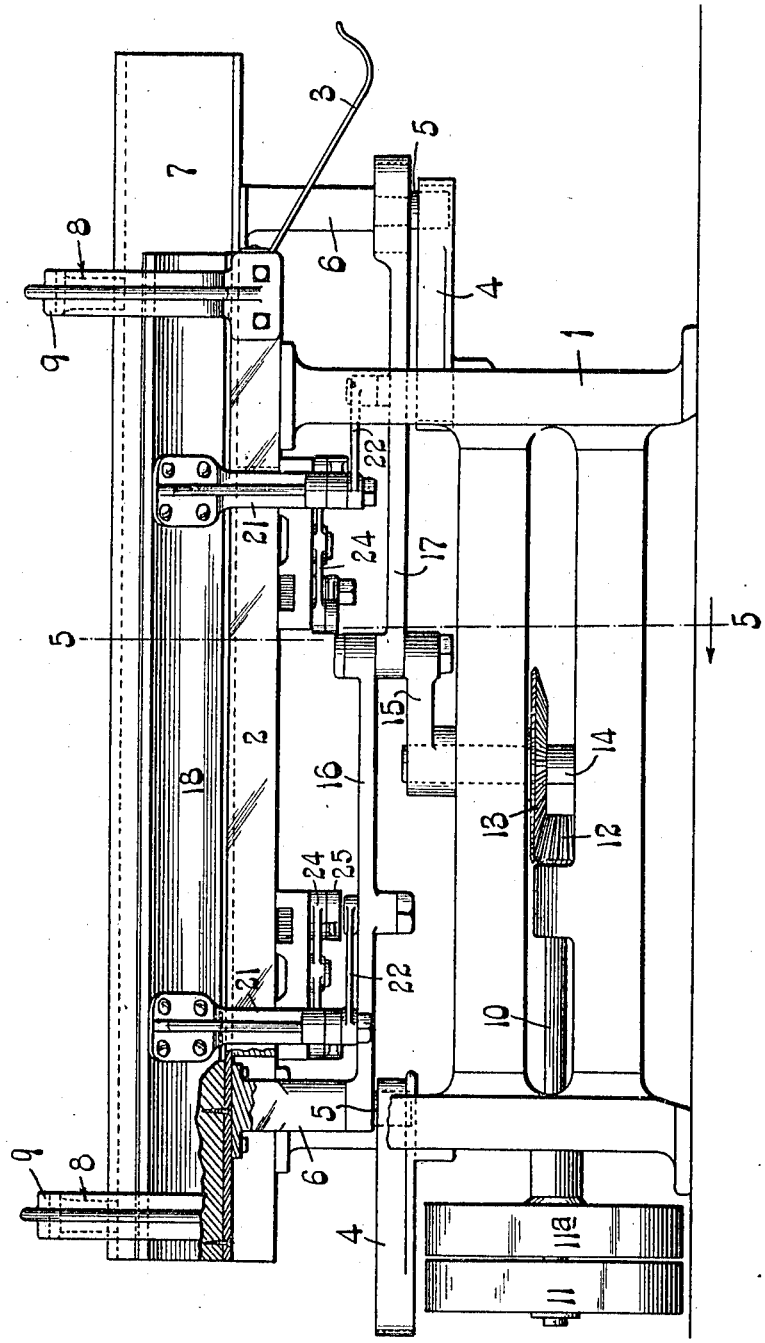
Figure 5:
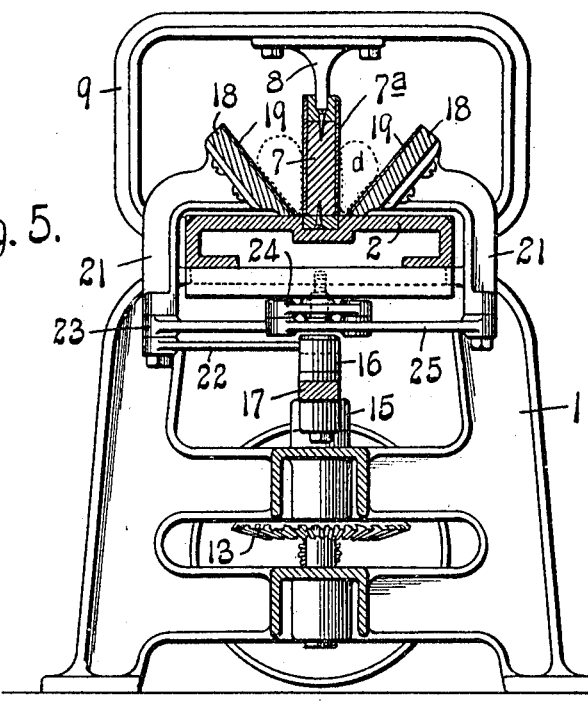
Figure 6:
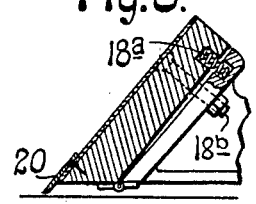
Figure 7:
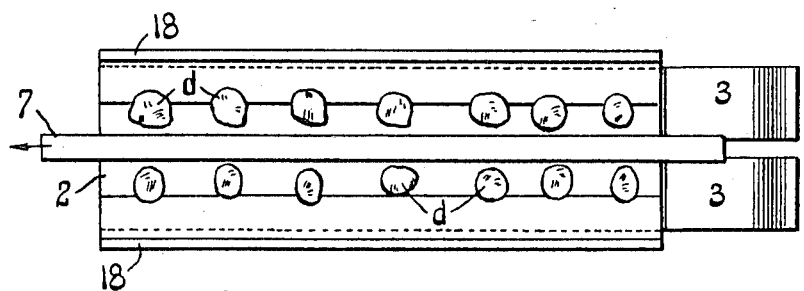
Figure 8:
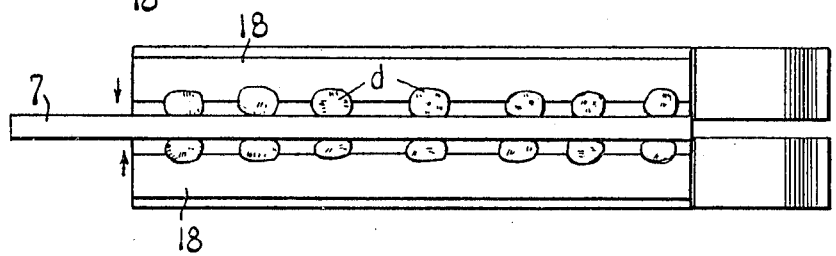
Figure 9:
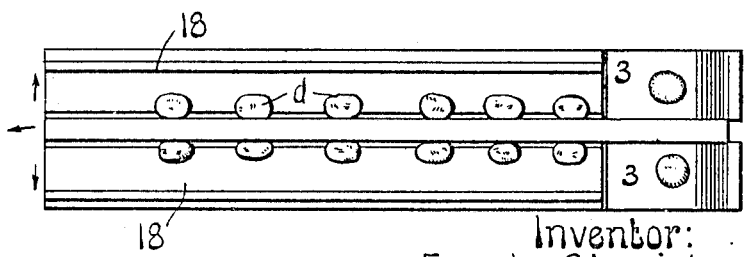

Figure 1 is a side elevational view of my improved machine. Fig. 2 is a top plan view, showing the molding boards in their innermost position. Figs. 3 and 4 are diagrammatic views of the operating levers. Fig. 5 is a cross sectional view on line 5—5. Fig. 1. Fig. 6 is an enlarged view of one of the molding boards. Figs. 7, 8 and 9 are diagrammatic views.

This invention relates to a new and useful improvement in machines for molding lumps of dough of various shapes and sizes into ellipsoidal form, and at the same time stretching the skin of such lumps over the top and sides and to a point at the bottom of the completed loaf. The finished loaf is discharged onto a shelf where it will settle into the form of a flattened sphere.

My present machine is very simple and cheap in construction, very easily operated and requires little power to run it. The dough to be treated is first made and allowed to "set", after which it is weighed and placed on one or both sides of the center board. The lumps of dough being treated are gradually fed through the machine, the machine kneading the dough and working it after the manner of manual manipulation, the skin on the top and sides of the loaf being stretched and drawn to substantially a point at the bottom of the loaf. The kneading of the lumps of dough as they pass through the machine prevents the formation of large gas bubbles in the center of the loaf, and by subjecting the lump to uniform treatment throughout, simultaneously with the skin-stretching operation, the texture of the loaf is uniform.

The essential features of my present invention reside in the employment of a movable board standing perpendicular to the table, and inclined molding boards arranged on one or both sides of the perpendicular board, combined with means for vibrating the table board longitudinally and contemporaneously moving the molding boards laterally, toward the vertical board as it moves in one direction, and away from said vertical board as it moves in the opposite direction.

Novel features also reside in the means for moving the board.

In the drawings, 1 indicates a frame upon which is supported a table 2.

3 is a trough or shelf-like extension at the discharge end of the table.

4 are slotted guide tracks in which operate rollers 5 arranged on posts 6 extending down from each end of the vertical molding board 7. This molding board 7, or center board as it might be called, where two side molding boards are employed, operates in grooves in the table 2. See Fig. 5. Said molding board 7 is provided with a groove in its upper edge for receiving depending guide posts 8 which are supported from frame castings 9 arranged at each end of the table 2. In this manner, the center board 7 is held rigidly in position, but is permitted to move longitudinally.

10 is a driving shaft on which are arranged fast and loose pulleys 11 and 11$^a$. Shaft 10 carries a pinion 12 meshing with a gear 13 on the shaft 14, said shaft carrying a crank arm 15 at its upper end. To this crank arm are connected two links 16 and 17, link 16 being pivotally connected to one of the posts 6 and link 17 being slotted to receive the other post 6. In this manner, the revolutions of the crank arm 15 will vibrate the molding board 7, moving it longitudinally, the movement of the molding board at the time of its reversal being relatively slow, as the crank pin passes the "line of centers" at this time. The motion of the molding board 7 is most rapid when the crank arm 15 stands at right angles thereto, as shown in Fig. 3 and this rapid movement is taken advantage of to place the molding board 7 quickly into position where it will operate upon the dough. In other words, at the time of this quick movement, the molding board is being moved from right to left in Fig. 3 and is not in active relation to the dough being treated.

18 are the inclined side molding boards which operate upon the table 2, said molding boards, like the molding board 7, being preferably made of wood faced with fabric 19, being provided with a metal wear strip 20 at its lower inner edge. The molding board 7 heretofore described is provided with fabric facing 7ª, its top and bottom edges having metal wear strips, for well understood reasons.

Each of the inclined molding boards 18 is provided with a post 21, at each end, said posts being bent inwardly at their upper ends to accommodate the table 2. To the lower ends of the posts 21 of one molding board 18 are connected links 22, which links are in turn connected to the links 16 and 17; hence, when the links 16 and 17, which are fulcrumed on the posts 6, are oscillated, lateral movement is imparted to one of the molding boards 18. This lateral movement is timed with relation to the longitudinal movement of the board 7 so that as the board 7 is moving in one direction, starting slowly at first, its speed increasing as the crank pin 15 reaches its position of greatest angularity and then slowly decreasing until brought to a position of rest and its motion reversed. The reverse movement of the board 7 is the same, that is, starting slowly, its speed increasing to maximum and then dying down until arrested and reversed. The board 18 approaches the board 7 when the latter is moving in one direction and recedes from said board 7 when the latter is moving in opposite direction. The differential speed imparted to board 7 is also imparted to the board 18, starting slowly and increasing to maximum speed and then dying down to a position of rest preceding reversal. The companion board 18 is operated by complementary mechanism which imparts the opposite movement to said companion board. Of course, the companion board could be operated direct from the directly connected board just above described, in which event it would alternate with the directly driven board in its approach to, and recession from the board 7. I prefer, however, to have both boards 18 move in opposite directions in unison, for by so doing I provide for an equal pressure on both sides of the center board 7 in its operation.

The mechanism for operating the companion board from the directly connected board 18 consists of links 23 connected to levers 24 pivotally mounted on the underside of the table 2 and to which are connected the links 25 pivotally mounted upon the posts 21 of the companion board 18. The operation of this link and lever connection is obvious.

Referring to Figs. 3 and 7, it will be observed that the lumps of dough $d$ are relieved from pressure and are resting on the table 2. While in this position, the crank arm 15 is moving from the position shown in Fig. 3 through the first quarter of its revolution; the board 7 is moving in the direction of the arrow at its maximum speed, and the boards 18 have been arrested in their outermost position and are starting slowly inwardly. In the second quarter of its revolution, or in moving to the position shown in Figs. 4 and 8, the board 7 is moving to the right and the boards 18 have been caused to approach each other slowly, they gently picking up the dough and moving it toward the board 7. In the third quarter of its revolution, or in moving from the full line position to the dotted line position shown in Fig. 4 (Fig. 9 corresponding to the dotted line position), the dough is brought in contact with the board 7 and subjected to lateral pressure, as well as a rolling action, the lumps of dough being moved toward the right by the board 7. The boards 18 are not, in this third quarter movement, separated from the board 7, notwithstanding the fact that the pivotal connections of the links 22 to the links 16 and 17 are moved laterally in a direction tending to separate the boards 18, for the reason that the longitudinal movement of the board 7 carries said pivotal points of connection to the right, as indicated by the dotted line in Fig. 4 and consequently the boards 18 are not only not separated, but are brought closer to the board 7, or from the position shown in Fig. 8 to the position shown in Fig. 9. This slow approach of the boards 18 in this third quarter is relied upon to feed the lumps of dough toward the discharge end of the machine. In the fourth quarter, the board 7 starts back slowly, and the boards 18 start to separate slowly. However, as board 7 gains in speed in its leftward movement, the boards 18 also gain in speed in their outward movement, they relieving the lumps of dough of lateral pressure and dropping them upon the table 2, where they rest, as shown in Fig. 7, until the crank pin 15 starts on its first quarter after completing its full cycle.

By referring to Fig. 5, it will be observed that the balls of dough are rounded at the top and have their lower end tapered, the skin being drawn substantially to a point at the bottom of the ball. This ball of dough, shaped like a "top", is held upright until, of its own plasticity, it settles into a spherical form, in which the erstwhile pointed end is approximately in the center of the bottom face of the lump. To adjust the angle of incline of boards 18, I pivot them at their lower ends to the posts 21 as shown in Fig. 6, and arrange springs 18ª under their upper ends, which springs tend to force the upper ends inwardly. A nut and bolt 18ᵇ are provided for adjustment, they holding the board against inward movement. The upper part of the board, however, can yield outwardly and in this way it is possible to exert greater pressure on the dough than the strength of the springs 18ª; of course, if the board 18 is solid against the post, it will have reached its yielding movement and exert a greater amount of pressure on the dough than the springs exert.

I am aware that minor changes in the construction and arrangement of the several parts of my device may be made and substituted for those herein shown and described, without departing from the nature and principle of my invention.

Having thus described my invention, what I claim is:

1. In a dough molding machine, a vertical molding board, a movable inclined molding board, and means for reciprocating the vertical molding board longitudinally.

2. In a dough molding machine, a vertical molding board, a movable inclined molding board, and means for differentially reciprocating the vertical molding board longitudinally.

3. In a dough molding machine, a vertical molding board, an inclined molding board, means for differentially reciprocating the vertical molding board longitudinally, and means for differentially vibrating the inclined molding board laterally.

4. In a dough molding machine, a vertical molding board, an inclined molding board, means for reciprocating the vertical board longitudinally and means for vibrating the inclined board laterally.

5. In a dough molding machine, a longitudinally reciprocating mold board, a laterally vibrating mold board, and means for moving said boards.

6. In a dough molding machine, a longitudinally reciprocating mold board, a laterally vibrating mold board, a drive shaft, and means for converting the motion of said drive shaft to reciprocate and vibrate said mold boards.

7. In a dough molding machine, a longitudinally reciprocating mold board, and laterally vibrating mold board on each side thereof.

8. In a dough molding machine, a longitudinally reciprocating mold board, laterally vibrating mold boards on each side thereof and means for imparting differential movements to said boards.

9. In a dough molding machine, a reciprocating center board and movable inclined boards arranged on each side of said center board.

10. In a dough molding machine, a reciprocating center board and inclined molding boards on each side thereof, the angularity of said molding boards being adjustable.

11. In a dough molding machine, a reciprocating center board and laterally vibrating molding boards on each side thereof, said molding boards moving in opposite directions.

12. In a dough molding machine, a reciprocating vertical molding board and a pivotally mounted inclined mold board mounted to reciprocate on each side thereof.

13. In a dough molding machine, a reciprocating vertical vibratory mold board, a pivotally mounted inclined mold board, mounted to reciprocate on each side thereof and means for adjusting the free edges of said inclined mold boards.

14. In a dough molding machine, a vertical molding board, an inclined molding board, one of said boards being yielding with respect to the other, means for reciprocating the vertical board longitudinally, and means for vibrating the inclined board laterally.

15. In a dough molding machine, a vertical molding board, an inclined molding board arranged at an angle to said vertical molding board, means for reciprocating the vertical board longitudinally, and means for vibrating the inclined board laterally.

16. In a dough molding machine, a vertical molding board, a yielding inclined molding board, means for adjusting the angular relation of said boards to each other, means for reciprocating the vertical board longitudinally, and means for vibrating the inclined board laterally.

17. In a dough molding machine, two mold boards, a link connected to one of said mold boards and to a crank pin, and a link connecting said first mentioned links and the other of said mold boards.

18. In a dough molding machine, a longitudinally reciprocating mold board, a crank and links connecting said crank and mold board, one of said links having a slot and pin connection with said mold board.

19. In a dough molding machine, a longitudinally reciprocating mold board, laterally vibrating mold boards on each side thereof, a crank pin, a link connecting said crank pin to the first mentioned mold board, and lever mechanism connected to said links for driving the laterally movable mold boards.

20. In a dough molding machine, a longitudinally reciprocating mold board, a table upon which the same is mounted, slotted brackets arranged below said table, and rollers in the ends of said mold board coöperating with said brackets.

21. In a dough molding machine, a table, a longitudinally reciprocating mold board operating in said table, laterally movable mold boards operating upon said table, posts depending from all of said mold boards, and mechanism arranged under the table and connected to said posts for operating said mold boards.

22. In a dough molding machine, two mold boards one of which is movable toward and from the other, and means for effecting a quick recession and a slow approach of said movable mold board with respect to its companion.

23. In a dough molding machine, two mold boards movable at angles to each other, and means for imparting a quick movement to the mold board as it moves away from its companion, and a slow movement as said mold board moves toward its companion.

24. In a dough molding machine, two mold boards, one of which is longitudinally reciprocated and the other of which is laterally vibrated, and means for effecting said lateral vibration, said means causing said mold board to slowly approach the longitudinal movable mold board when the latter is moving in one direction, and to quickly recede from said longitudinally movable mold board when it is moving in the opposite direction.

In testimony whereof I hereunto affix my signature in the presence of two witnesses, this 18th day of January, 1909.

FRANK STREICH.

Witnesses:
  LENORE CLARK,
  F. R. CORNWALL.